(12) United States Patent
Bartscher et al.

(10) Patent No.: US 8,169,355 B2
(45) Date of Patent: May 1, 2012

(54) DEVICE FOR IMAGING TEST OBJECTS USING ELECTROMAGNETIC WAVES, IN PARTICULAR FOR INSPECTING PEOPLE FOR SUSPICIOUS ITEMS

(75) Inventors: Bernd Bartscher, Wiesbaden (DE); Uwe Flehmig, Wiesbaden (DE); Michael Jeck, Mainz (DE)

(73) Assignee: Smiths Heimann GmbH, Wiesbaden (DE)

( * ) Notice: Subject to any disclaimer, the term of this patent is extended or adjusted under 35 U.S.C. 154(b) by 426 days.

(21) Appl. No.: 12/545,534

(22) Filed: Aug. 21, 2009

(65) Prior Publication Data

US 2010/0045514 A1 Feb. 25, 2010

Related U.S. Application Data

(63) Continuation of application No. PCT/EP2008/001073, filed on Feb. 13, 2008.

(30) Foreign Application Priority Data

Feb. 21, 2007 (DE) .......................... 10 2007 008 871

(51) Int. Cl.
*G01S 7/40* (2006.01)
*G01S 13/89* (2006.01)
*G01S 13/90* (2006.01)
*G01S 7/00* (2006.01)
*G01S 13/00* (2006.01)

(52) U.S. Cl. ....... 342/25 A; 342/22; 342/25 R; 342/165; 342/173; 342/175; 342/176; 342/179; 342/195

(58) Field of Classification Search ................ 342/1–12, 342/21, 22, 25 R–25 F, 165–176, 179, 195, 342/52–55, 188, 350–352; 343/700 R, 720, 343/721, 725, 772, 781 R–781 CA
See application file for complete search history.

(56) References Cited

U.S. PATENT DOCUMENTS 4,652,885 A * 3/1987 Saffold et al. ................. 343/725
4,860,016 A * 8/1989 Westphal et al. ............. 342/169
(Continued)

FOREIGN PATENT DOCUMENTS

DE 3801626 C1 12/1988
(Continued)

OTHER PUBLICATIONS

Bing Sun et al. "Image Formation Algorithm for the Implementation of Circular Scanning SAR", RADAR, 2006 CIE' 06. International Conference on. IEEE PI, Oct. 1 2006, pp. 1-4.

*Primary Examiner* — Bernarr Gregory
(74) *Attorney, Agent, or Firm* — Muncy, Geissler, Olds & Lowe, PLLC

(57) ABSTRACT

To depict test objects using electromagnetic waves, particularly to check people for suspicious articles, an apparatus is provided having: an antenna which emits electromagnetic waves, particularly millimetric waves, means for concentrating the emitted waves in three dimensions, and means for manipulating the waves at the point of high concentration such that this point serves as a moving virtual antenna for SAR evaluation. Whereby the means for three-dimensional concentration contain a rotatably mounted, focusing or defocusing, quasi-optical element and the means for manipulating the waves at the point of high concentration contain a reflector. In accordance with the invention, the quasi-optical element and the reflector are rotatably mounted about a common rotary axis and at the same angular velocity.

8 Claims, 4 Drawing Sheets

U.S. PATENT DOCUMENTS

| | | | |
|---|---|---|---|
| 4,864,308 A * | 9/1989 | Raab et al. .................... 342/351 |
| 4,901,084 A * | 2/1990 | Huguenin et al. ............ 342/179 |
| 4,910,523 A * | 3/1990 | Huguenin et al. ............ 342/179 |
| 5,047,783 A * | 9/1991 | Hugenin ........................ 342/179 |
| 5,073,782 A * | 12/1991 | Huguenin et al. ............ 342/179 |
| 5,077,557 A * | 12/1991 | Ingensand .................... 342/352 |
| 5,083,130 A * | 1/1992 | Cardiasmenos .............. 342/188 |
| 5,091,730 A * | 2/1992 | Cardiasmenos et al. ........ 342/53 |
| 5,170,169 A * | 12/1992 | Stephan ........................ 342/179 |
| 5,202,692 A * | 4/1993 | Huguenin et al. ............ 342/179 |
| 5,227,800 A * | 7/1993 | Huguenin et al. ............ 342/179 |
| 5,298,909 A * | 3/1994 | Peters et al. ................. 343/720 |
| 5,760,397 A * | 6/1998 | Huguenin et al. ............ 342/179 |
| 6,492,955 B1 | 12/2002 | Amyotte et al. |
| 6,777,684 B1 * | 8/2004 | Volkov et al. ................. 342/179 |
| 7,609,196 B2 * | 10/2009 | Jeck et al. .................... 342/25 A |
| 7,626,400 B2 * | 12/2009 | Holbrook et al. ............... 342/22 |
| 7,889,113 B2 * | 2/2011 | Cardiasmenos et al. ........ 342/22 |
| 2008/0211713 A1 * | 9/2008 | Jeck ............................. 342/25 A |

FOREIGN PATENT DOCUMENTS

| | | |
|---|---|---|
| DE | 10 2005 042 463 A1 | 3/2007 |
| DE | 10 2006 006 962 A1 | 8/2007 |
| WO | WO 2006/088845 A2 | 8/2006 |

\* cited by examiner

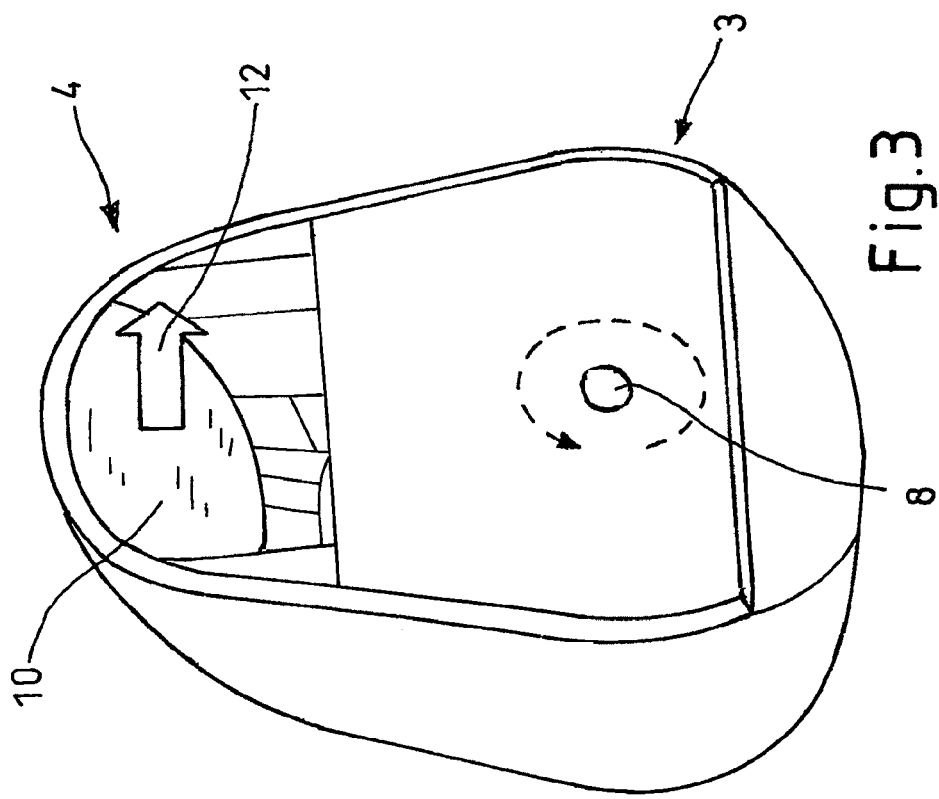
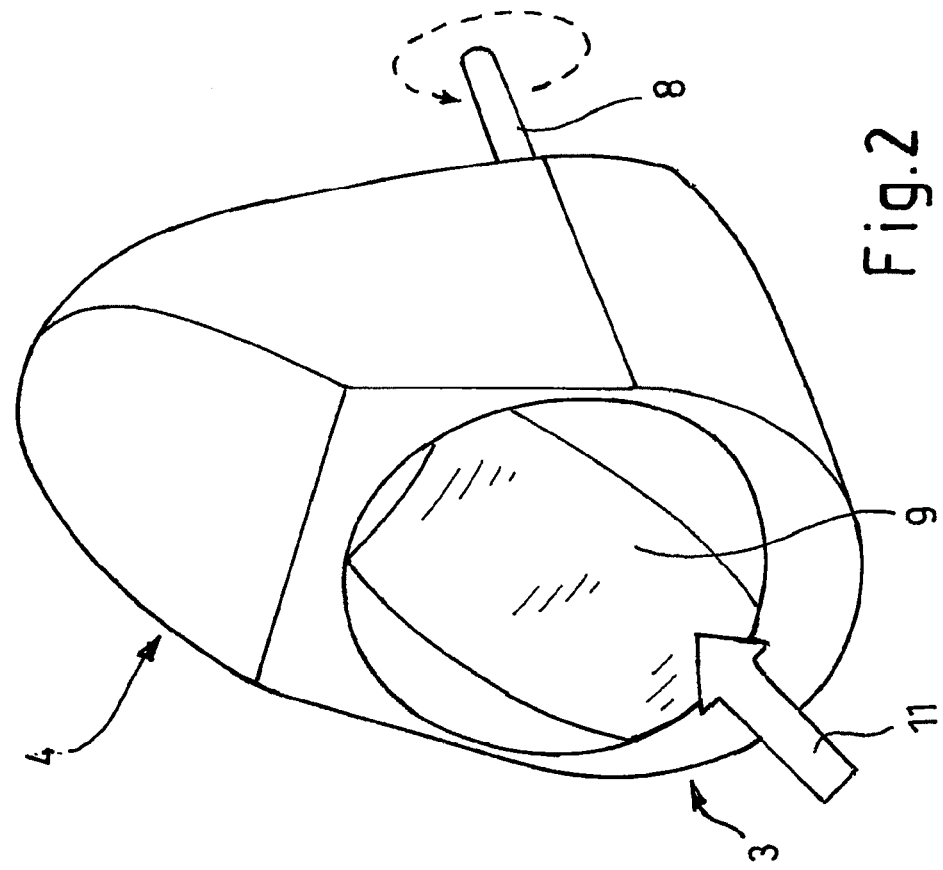

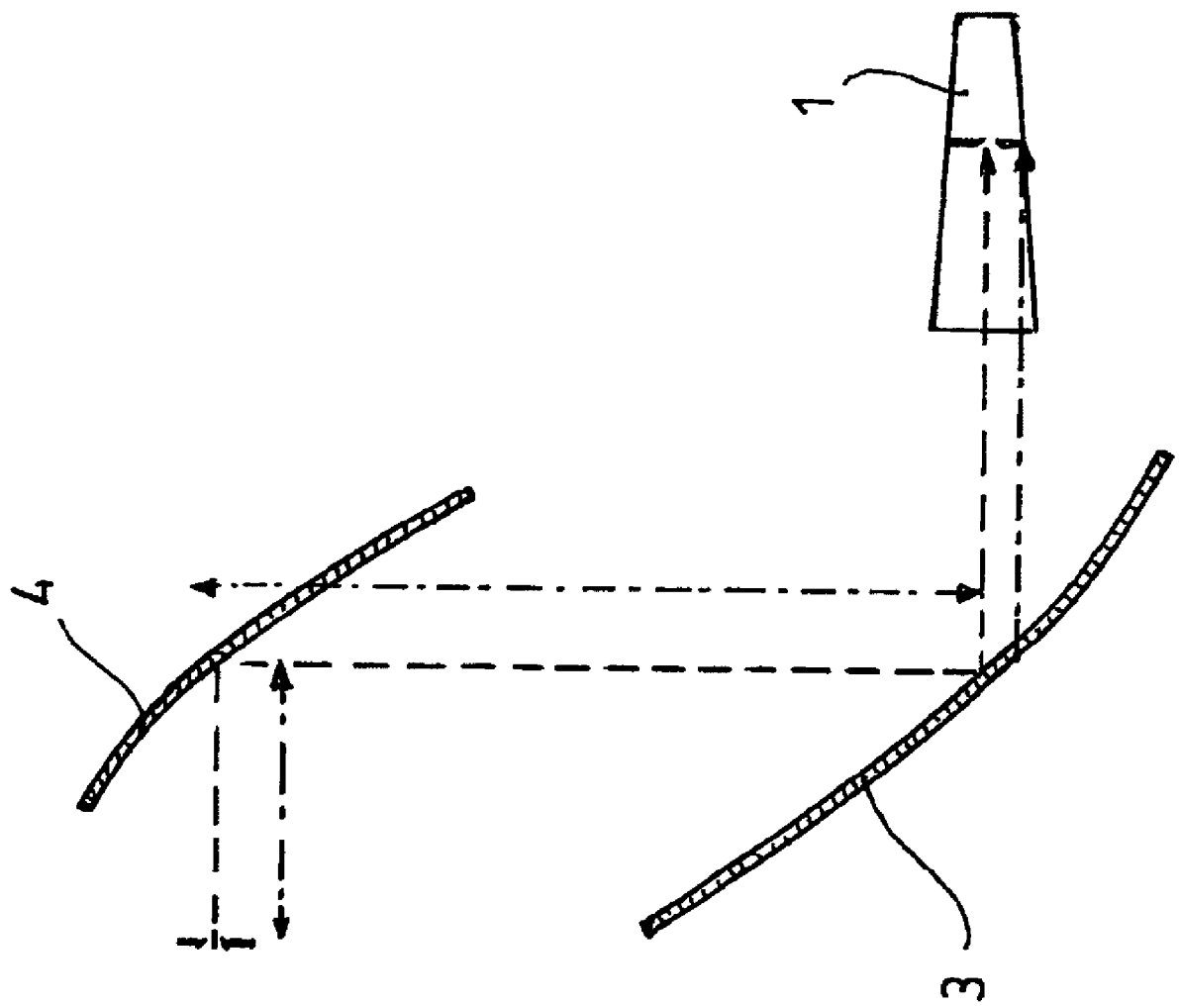

DEVICE FOR IMAGING TEST OBJECTS USING ELECTROMAGNETIC WAVES, IN PARTICULAR FOR INSPECTING PEOPLE FOR SUSPICIOUS ITEMS

This nonprovisional application is a continuation of International Application No. PCT/EP2008/001073, which was filed on Feb. 13, 2008, and which claims priority to German Patent Application No. 10 2007 008 871.1, which was filed in Germany on Feb. 21, 2007, and which are both herein incorporated by reference.

BACKGROUND OF THE INVENTION

1. Field of the Invention

The present invention relates to a device for imaging test objects via electromagnetic waves, and which includes: an antenna that emits electromagnetic waves, especially millimeter waves; a component for spatially concentrating the emitted waves, and a component for manipulating the waves at the location of high concentration in such a manner that this location serves as a moving virtual antenna for an SAR analysis, wherein the component for spatial concentration are a rotatably mounted, focusing or defocusing quasi-optical element, and the component for manipulating the waves at the location of high concentration contain a reflector.

2. Description of the Background Art

In such a device of the generic type described in German patent application 10 2005 042 463, which corresponds to U.S. Publication No. 20080211713, and which is incorporated herein by reference, in order to inspect individuals or pieces of luggage (hereinafter referred to as test objects) for hidden dangerous items (weapons, explosives), the test objects are scanned with millimeter waves in order to detect suspicious items. During this process, the test object is successively illuminated with millimeter waves along its circumference, and the scattered waves are received and analyzed using the SAR principle to display an image of the test object.

The device described in DE 10 2005 042 463 makes it possible to apply a two-dimensional SAR method that permits high resolution in both the X and Y directions. Through the use of movable, virtual antennas, the SAR method can be implemented without requiring complex antenna drivers.

SUMMARY OF THE INVENTION

It is therefore an object of the present invention to improve the conventional device such that it permits improved resolution with lower distortion using less resource-intensive equipment.

In order to attain this object, the quasi-optical, focusing or defocusing element and the reflector are mounted so as to be rotatable about a common axis of rotation at the same angular velocity. This design permits increased aperture angles for the electromagnetic radiation. These result in an increased scanning region of the test object and also in an increased aperture of the virtual antenna for the SAR analysis. The spacing between the axis of rotation of the focusing or defocusing element and the virtual antenna can be made as large as possible in order to obtain a large scanning region on the test object.

The arrangement of the quasi-optical, focusing or defocusing element and the reflector in a common, rotatably mounted component is advantageous in terms of design.

Due to the design of the reflector as focusing or defocusing for the electromagnetic waves, two focusing or defocusing elements in the manner of a telescope are obtained. This permits a distortion-free design of the moving virtual source.

A design of both the quasi-optical element and the reflector as focusing results in a compact, telescope-like structure.

The quasi-optical element and the reflector can be designed as mirrors. A virtual antenna motion to be analyzed that is as simple to control as possible is the result when the quasi-optical element and the reflector are designed and arranged such that the central ray incident on the quasi-optical element is parallel to the central ray that leaves the reflector.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 2 shows a rear view according to an embodiment;

FIG. 3 shows a front view of a device according to an embodiment with a Z-shaped beam path;

FIG. 4 shows beam path in cross section;

DETAILED DESCRIPTION

The devices shown in the figures are each part of an inspection unit used to inspect airline passengers at an airport. The inspection unit is used to scan airline passengers for suspicious items such as weapons or explosive substances during check-in. The electromagnetic waves used for illuminating the test objects can have a frequency between 1 GHz and 10 THz. Preferably, millimeter waves with a frequency between 30 GHz and 300 GHz are used. Either the transmitting antennas themselves or separate receiving antennas can be used to receive the reflected waves.

Preferably the inspection unit includes a platform upon which the test object, for example an airline passenger, is located while the inspection is being carried out. In one embodiment, the transmitting and receiving systems rotate about the stationary test object in order to successively illuminate it along its circumference with millimeter waves. Alternatively, it is also possible to have the test object itself rotate on a platform before a stationary transmitting and receiving system.

In addition, the inspection unit includes an analysis system having suitable computing power, which uses the SAR principle to analyze the received waves scattered by the test object in order to obtain an image of the test object. The images produced are displayed to an operator on suitable display devices.

Figure 1:
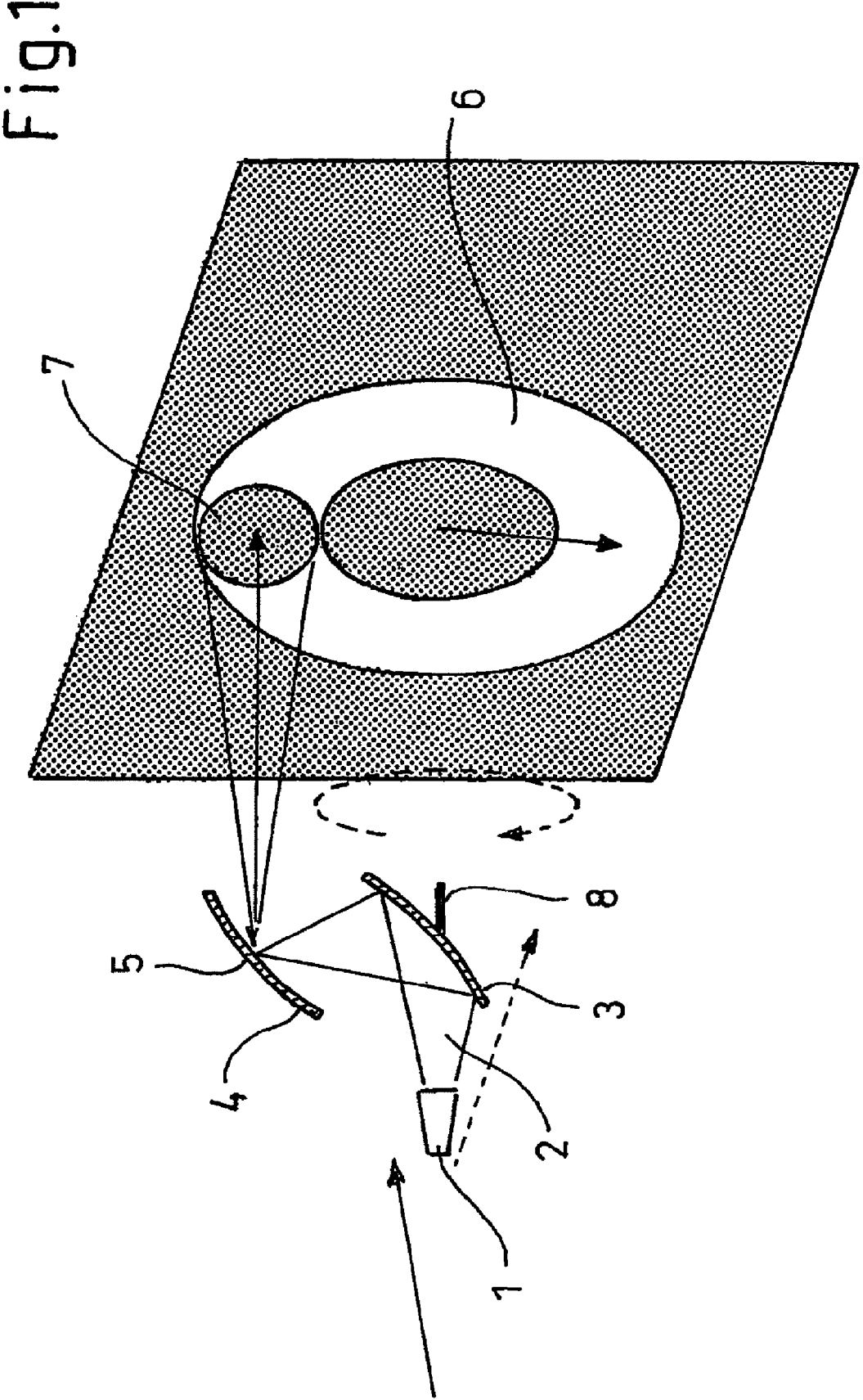
FIG. 1 shows a function of the device as a schematic diagram according to an embodiment.
Figure 6:
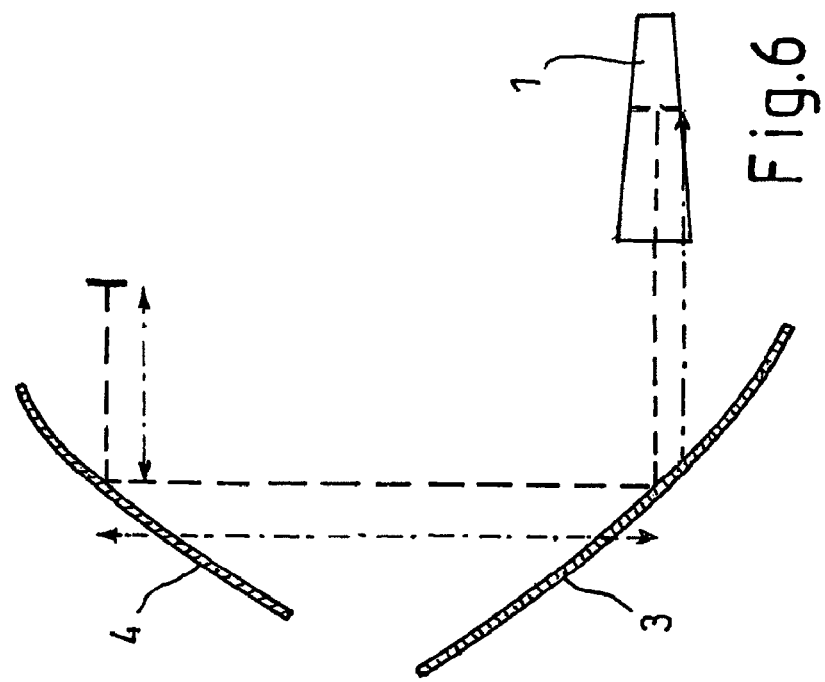
FIG. 6 shows the beam path of this device in cross section.

The embodiment shown in FIGS. 1 and 2 includes an antenna 1, preferably a horn antenna, which emits millimeter waves 2. The millimeter waves 2 strike a rotatably mounted, focusing or defocusing quasi-optical element 3, from which they are reflected and simultaneously concentrated. Preferably the element 3 is a rotating focusing mirror, which deflects the beams 2 towards a reflector 4 and concentrates them thereon, so that the location 5 of maximum concentration lies on the reflector 4 and moves along a circle therewith. The reflector 4 is shaped such that, in cooperation with the rotating component 3, the surface 6 to be imaged is scanned in a circular fashion, as shown in FIG. 1.

The location 5 of greatest concentration, which is to say the reflection point on the reflector 4, is small enough in size that it can be treated as a virtual antenna that produces a cone of rays 7 in the far field with a large aperture angle. This large aperture angle is necessary for good resolution using SAR algorithms. The cone of rays 7 that is generated scans the test object under inspection in a circular manner.

In addition, the transmitting and receiving system is moved horizontally (out of the plane of the drawing in FIG. 1) or vertically (upward and downward in FIG. 1), so that the test object is scanned in two dimensions overall. If the entire transmitting and receiving system is moved about the test object, then scanning from different viewpoints is also possible.

The quasi-optical element 3 that focuses or defocuses the waves arriving from the antenna 1, and the reflector 4, should be mounted such that they can rotate about a common axis of rotation and at the same angular velocity. The example embodiments show the preferred implementations in which the quasi-optical element 3 and the reflector 4 are each designed as a mirror with a focusing effect. For the most compact construction possible and for simplified analysis, the quasi-optical element 3 and the reflector 4 are designed and arranged such that the central ray incident on the quasi-optical element 3 from the antenna 1 is parallel to the central ray of the diverging cone of rays that leaves the reflector 4.

In the case of both embodiments shown in the drawings, the quasi-optical element 3 and the reflector 4 are arranged in a common component that is mounted such that it can rotate about an axis of rotation 8. Preferably, the component is connected to a rotary drive such that its axis of rotation 8 coincides approximately with the central ray of the cone of rays leaving the antenna 1. The axis of rotation 8 thus passes through the element 3 approximately in the center and at an angle to its reflecting surface 9, as is evident from FIG. 1. The component containing the element 3 and the reflector 4 is made of a light, low-inertia material. It contains a reflecting surface 9 of the quasi-optical element 3, by which the rays incident from the antenna 1 are focused onto the reflecting surface 10 of the reflector 4 arranged subsequent thereto. The reflecting surface 10 of the reflector 4 rotating about the axis of rotation thus serves as a virtual antenna for the SAR analysis. In both embodiments, the reflecting surfaces 9, 10 of the quasi-optical element 3 and reflector 4 are designed and arranged such that the central ray incident on the quasi-optical element is parallel to the central ray leaving the reflector 4.

FIGS. 2 and 3 show a component that contains the quasi-optical element 3 and the reflector 4 in a so-called Z-arrangement. Here, the reflecting surface 9 of the element 3 and the reflecting surface 10 of the reflector are arranged such that a ray (arrow 11) incident from behind strikes the reflecting surface 9, is concentrated and deflected thereby toward the reflecting surface 10 of the reflector 4, and subsequently emerges from the front of the component (arrow 12) diverging parallel to and in the forward direction of the incident ray (arrow 11).

Figure 5:
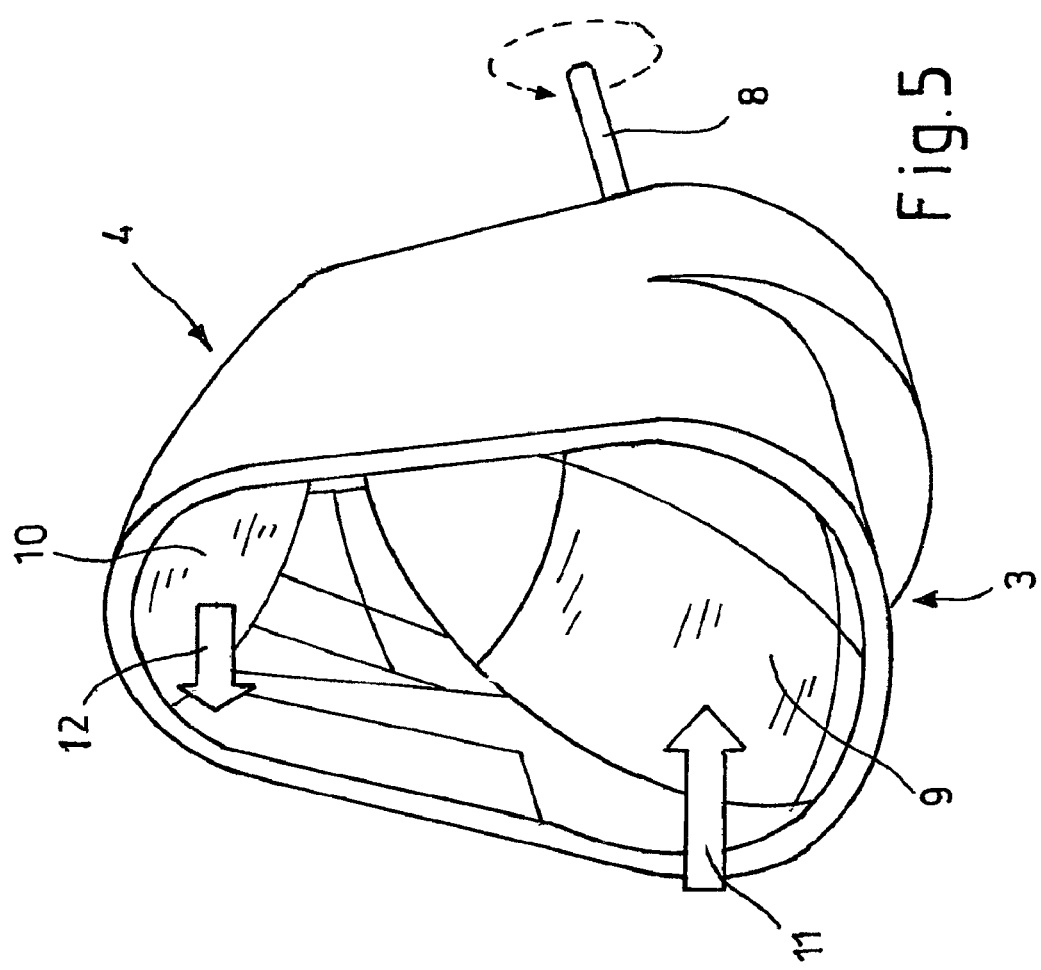
FIG. 5 shows another device with a U-shaped beam path.

In the alternative U-shaped embodiment in FIG. 5, the incident ray 11 strikes the reflecting surface 9 of the quasi-optical element 3, and—as in the embodiment in FIG. 2—is deflected thereby upward to the reflecting surface 10 of the reflector 4. The reflecting surface 10 is arranged such that the diverging cone of rays reflected from it (arrow 12) exits the component opposite to the direction of incidence of the ray incident from the antenna 1 (arrow 11). In this embodiment as well, the central ray of the emerging divergent cone of rays (arrow 12) is parallel to the central ray of the incident cone of rays (arrow 11).

The case of transmission is described in each case above. Since the beam path is reciprocal, the system operates in a corresponding manner in the case of reception. Transmitted and received signals are separated by suitable components, for example by the means that the antenna 1 is connected to a transmitting and receiving device through couplers, through circulators, and/or through an arrangement of reflector grids.

In like manner, the use of two antennas or antenna systems positioned in close proximity to one another, each having a transmitting or receiving function, is possible instead of a single antenna 1. The antenna 1 is then composed of at least one transmitting antenna and at least one spatially separated receiving antenna.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. Device for imaging test objects via electromagnetic waves, the device comprising:
   an antenna configured to emit electromagnetic waves;
   a rotatably mounted, focusing or defocusing quasi-optical element configured to spatially concentrate the emitted electromagnetic waves; and
   a component including a reflector configured to manipulate the waves at a location of high concentration such that the location serves as a moving virtual antenna for an SAR analysis,
   wherein the quasi-optical element and the reflector are mounted so as to be rotatable about a common axis of rotation at a same angular velocity.

2. The device according to claim 1, wherein the quasi-optical element and the reflector are arranged in a common component that is rotatably mounted.

3. The device according to claim 1, wherein the reflector is configured to focus or defocus the electromagnetic waves.

4. The device according to claim 3, wherein the quasi-optical element and the reflector are both focusing in design.

5. The device according to claim 1, wherein the quasi-optical element and the reflector are mirrors.

6. The device according to claim 1, wherein the quasi-optical element and the reflector are configured and arranged such that a central ray incident on the quasi-optical element is substantially parallel to a central ray that leaves the reflector.

7. The device according to claim 1, wherein the device inspects individuals for suspicious items.

8. The device according to claim 1, wherein the electromagnetic waves are millimeter waves.

* * * * *